United States Patent
Amundsen et al.

(10) Patent No.: US 10,264,782 B2
(45) Date of Patent: Apr. 23, 2019

(54) COOLING PANEL ASSEMBLY FOR A WIND TURBINE TOWER AND A WIND TURBINE TOWER

(71) Applicant: MHI Vestas Offshore Wind A/S, Aarhus N (DK)

(72) Inventors: John Amundsen, Frederiksberg C (DK); Anders Vejby, Højbjerg (DK); Chris Spruce, Leatherhead (GB)

(73) Assignee: MHI Vestas Offshore Wind A/S, Aarhus N (DK)

( * ) Notice: Subject to any disclaimer, the term of this patent is extended or adjusted under 35 U.S.C. 154(b) by 0 days.

(21) Appl. No.: 15/744,261

(22) PCT Filed: Jul. 11, 2016

(86) PCT No.: PCT/DK2016/050247
§ 371 (c)(1),
(2) Date: Jan. 12, 2018

(87) PCT Pub. No.: WO2017/008817
PCT Pub. Date: Jan. 19, 2017

(65) Prior Publication Data
US 2018/0199564 A1  Jul. 19, 2018

(30) Foreign Application Priority Data

Jul. 16, 2015   (DK) .................... 2015 70470

(51) Int. Cl.
*F03D 9/25* (2016.01)
*A01M 29/32* (2011.01)
(Continued)

(52) U.S. Cl.
CPC ............ *A01M 29/32* (2013.01); *F03D 13/20* (2016.05); *F03D 80/60* (2016.05);
(Continued)

(58) Field of Classification Search
CPC . F03D 80/60; F03D 9/25; F03D 80/80; F03D 80/88; E04D 13/004; Y02E 10/727
See application file for complete search history.

(56) References Cited

U.S. PATENT DOCUMENTS 7,040,058 B2 * 5/2006 Finkelstein ........... A01M 29/32
                                                               52/101
7,168,251 B1   1/2007 Janssen
(Continued)

FOREIGN PATENT DOCUMENTS

CN       102468038 A    5/2012
CN       104100460 A    10/2014
(Continued)

OTHER PUBLICATIONS

Danish Patent and Tradmeark Office, Exam and Search Report in PA 2015 70470, dated Feb. 8, 2016.
(Continued)

*Primary Examiner* — Brian E Glessner
*Assistant Examiner* — Daniel J Kenny
(74) *Attorney, Agent, or Firm* — Wood Herron & Evans LLP

(57) ABSTRACT

The invention relates to a cooling panel assembly (2) for a wind turbine tower (1). It is arranged to be mounted on such a tower (1) on a section thereof as seen in the circumferential direction. The cooling panel assembly (2) includes at least one cooling panel (2a,2b). According to the invention, the cooling panel assembly (2) includes deflector means (6) mounted at the top of the at least one cooling panel (2a, 2b) such that the deflector means (6) shields the cooling panel assembly (2) from above. The deflector means (6) has substantially the same circumferential extension or more as the other parts of the cooling panel assembly (2). The
(Continued)

invention also relates to a wind turbine tower (1) provided with at least one such cooling panel assembly (2).

15 Claims, 3 Drawing Sheets

(51) Int. Cl.
*F03D 13/20* (2016.01)
*F03D 80/60* (2016.01)

(52) U.S. Cl.
CPC ..... *F05B 2260/201* (2013.01); *F05B 2260/64* (2013.01); *F05B 2280/10* (2013.01); *Y02E 10/728* (2013.01)

(56) References Cited

U.S. PATENT DOCUMENTS

| | | | |
|---|---|---|---|
| 9,512,823 B2 * | 12/2016 | Nyvad | ............... F03D 1/04 |
| 9,631,368 B1 * | 4/2017 | Heo | ............... E04D 13/004 |
| 10,036,166 B1 * | 7/2018 | Heo | ............... E04B 1/72 |
| 2004/0040225 A1 | 3/2004 | Finkelstein | |
| 2008/0124213 A1 | 5/2008 | Inobben | |
| 2011/0001371 A1 | 1/2011 | Landeta Manzano et al. | |
| 2011/0272949 A1 | 11/2011 | Matsu et al. | |
| 2013/0015665 A1 * | 1/2013 | Wang | ............... F03D 80/60 290/55 |
| 2013/0309090 A1 * | 11/2013 | Abolfazlian | ............... F03D 80/00 416/1 |
| 2016/0165877 A1 * | 6/2016 | Sosa, Jr. | ............... A01M 29/30 52/101 |

FOREIGN PATENT DOCUMENTS

| | | |
|---|---|---|
| EP | 2325485 A1 | 5/2011 |
| EP | 2453451 A2 | 5/2012 |
| EP | 2792879 A2 | 10/2014 |
| WO | 2013185767 A1 | 12/2013 |
| WO | 2016000715 A1 | 1/2016 |

OTHER PUBLICATIONS

European Patent Office, International Search Report and Written Opinion in PCT Application Serial No. PCT/DK2016/050247, dated Sep. 27, 2016.

China National Intellectual Property Administration, First Notification of Office Action in CN201680041766.1, dated Jan. 25, 2019.

* cited by examiner

COOLING PANEL ASSEMBLY FOR A WIND TURBINE TOWER AND A WIND TURBINE TOWER

FIELD OF INVENTION

The present invention in a first aspect relates to a cooling panel assembly for a wind turbine tower, which cooling panel assembly is arranged to be mounted on such a tower and being dimensionally adapted to extend a short section of the tower circumferential when mounted thereto, and which cooling panel assembly includes at least one cooling panel.

In a second aspect, the invention relates to a wind turbine tower.

BACKGROUND OF INVENTION

Wind turbines, in particular those in the larger sizes require effective cooling of various equipment. Cooling may be effected by a cooling circuit having the equipment as the hot spot of the circuit and a passive cooling panel as the cold spot. Such cooling panels may be arranged on the tower somewhere between the nacelle and the base platform. One or more cooling panels together with the necessary related components such as the mounting brackets, pipes, hoses etc. form a cooling panel assembly.

Service equipment outside a high wind turbine tower is commonly performed by service technicians climbing the outside of the tower with the aid of some kind of ascending devices. When descending, the cooling panel assemblies may impose a safety threat potentially causing injury to a service technician if descending at high velocity and hitting the cooling panel assembly.

In addition there is a problem with birds roosting on the cooling panel assemblies. Investigations have shown that in the neighbourhood of a platform the density of seabirds is many times higher than the density above the surrounding waters. The horizontal surfaces around the passive cooling panels are likely to be attractive roosting locations for sea birds. Several conditions contribute to that: With three cooling panel assemblies spaced around the tower, one of them will always be in the lee of the tower, i.e. sheltered from the wind. The panels will be warm in winter. The lower brackets have good weather protection, due to the panels and upper brackets. The panels are above the wave break zone. The panels are high up enough to have a good view out over the sea.

If used for roosting, then there will almost certainly be a problem with guano accumulating on the cooling panels and reducing their effectiveness, possibly substantially. Service access is sometimes very limited on offshore turbines due to weather conditions. Therefore it is highly undesirable for service technicians to have to visit a turbine to clean guano off the panels.

WO2013185767 discloses a wind tower turbine of a kind for which the present invention is applicable. The disclosure addresses the problem of shielding off cooling panels from above. Shielding is performed by a circumferential flange around the tower. For large tower this represents a waste of material and construction work, since the shielding is needed only above the cooling panels. The large part of the flange thus is not only superfluous; it also creates a restriction for vertical transports between the cooling panels. Furthermore, the cooling panels are mounted onto the flange, implying that they have to be mounted in situ.

SUMMARY OF INVENTION

The object of the present invention is to eliminate or at least reduce the above described general problems, in particular to solve the personnel safety problem, but also to avoid the drawbacks entailing accumulation of guano on the cooling panels. More specifically the object is to achieve this while overcoming the drawbacks related to the prior art.

This object is according to the first aspect of the invention met in that a cooling panel assembly for a wind turbine tower is arranged to be mounted to the tower and is dimensionally adapted to extend along a section of the tower circumference when mounted to the tower. The cooling panel assembly includes at least one cooling panel The cooling panel assembly includes deflector means mounted at the top of the cooling panel such that it shields it from above, which deflector means has substantially the same circumferential extension or more as the other parts of the cooling panel assembly.

By providing such deflector panels at the top of the cooling panel assembly, a person being lowered towards the cooling panel assembly is prevented from hitting against the latter. The person will instead hit against the deflector panel which provides a less dangerous collision since the deflector panels do not have sharp and rigid edges and corners as the cooling panels. This decreases the risk for injury at descending.

Furthermore, the deflector panels will limit the possibilities for seabirds—and in case of a plant located on land, although the problem then is less severe, birds in general—to reach the cooling panels for roosting, whereby the problem of decreasing the effectiveness of the cooling panels due to guano is reduced.

By forming the deflector means as a part of the cooling panel assembly having about the same circumferential dimension the material and mounting efforts for the deflector means will be low. Particularly advantageous is that the deflector means may be mounted to the cooling panels in the factory assembly, which saves a lot of costs in comparison with mounting them in situ. A further advantage is that the parts of the circumferential of the tower, where there are no cooling panel becomes completely free, which facilitates ascend and descend in these regions, According to a preferred embodiment, the deflector means is inclined out from the tower in the downward direction.

The inclination results in a softer collision in case a service technician should hit against the deflector panel. This further reduces the risk for injury. When the deflector panel is inclined it will also be less inviting to roost on for a seabird.

According to a further preferred embodiment, the inclination of the deflector means is in the range of 15° to 45° with respect to the horizontal.

The more the deflector panels are inclined, the more soft a collision will be. On the other hand a smaller inclination leads to a more easy mounting of the deflector panel since it will be less exposed to forces from the wind. An inclination within the specified range represents an adequate balance between these two aspects. In most cases it will be optimal to have the angle in the range of 25° to 35°, for example about 30°.

According to a further preferred embodiment, the cooling panel assembly includes a pair of substantially vertical cooling panels deviating from each other outwardly from the tower such that a V-shape is established, and wherein the deflector means includes two deflector panels shielding a respective one of the cooling panels. In a further embodiment, the pair of cooling panels meet each other close to, or at, the tower.

Such an arrangement of the cooling panels is advantageous with respect to the cooling efficiency, since it offers a geometrically optimal position of these to be exposed to the cooling wind at various directions. In such kind of cooling panel assembly it will be constructional simple to separate the deflection panel means into an individual deflector panel for the respective cooling panel.

According to a further preferred embodiment, the two deflector panels meet each other without any clearance between them.

The elimination of any clearance between the deflector panels eliminates the risk that any rope or the like used by the service technician when descending from the nacelle will project down through such clearance and provide problem for the further descending.

According to a further preferred embodiment, the deflector panel means is made of a thin plate material, such as a thin plate metal sufficiently thin to result in a substantial deflection of the panel means when hit by a person from above.

By the deflection a collision between a falling person and the panel will be soft, and thereby further reduce the risk for injury. Of course the plate material must be sufficiently thick for not being broken at a collision.

According to a further preferred embodiment, the deflector means is made of one or more metal plates.

Using metal plates is advantageous with respect to combine high deflection with sufficient strength. They can thus be quite thin and thereby lead to a low weight. Metal is also advantageous with regards to sustainability in the harsh weather condition often prevailing.

According to a further preferred embodiment, surfaces of the cooling panel assembly which are located below the deflector means and are mainly horizontal and face upwards are provided with bird obstacles.

By mainly horizontal is meant that the surface forms an angle less than 45° with the horizontal.

By providing such obstacles against the birds, further reduces the possibility for them to roost on the cooling panel assembly. Thereby accumulation of guano on the panels will be further reduced. The obstacles may be mounted on each spot of each horizontal surface to effectively reduce the roosting possibility to zero. This also includes surfaces that may be oblique, but having a sufficient horizontal component to be attractive for roosting. However, the obstacles may be mounted only on those parts of the horizontal surfaces that may be particularly attractive for the seabirds to rest on. When mounting such obstacles, the importance of the deflector means for protecting against injury is accentuated since these obstacles otherwise would increase the danger if landing on a cooling panel assembly. It is to be understood that such obstacles may be mounted also on a cooling panel assembly without deflector means.

According to a preferred embodiment, at least some of the bird obstacles are spikes.

Although the bird obstacles may have any appropriate shape, it is found to be advantageous to shape them as spikes, i.e. a thin pin element. It is a very simple and thereby cheap element that is easy to mount. It is also very effective since the spike as such provides no spot to rest on. The spikes preferably are vertical, but may alternatively be somewhat inclined as long as the inclination is not to such an extent that it provides possibility for a bird to rest thereon.

The spikes may advantageously be arranged pairwise in a V-shaped configuration with an inclination of 30° to 60° in relation to the surface on which they are attached. A plurality of such pairs may be mounted along a strip. The strip may be bolted to the surface of the part on which the spikes are mounted. For example a strip may be 50 cm long and have 20 pairs of spikes mounted thereto.

According to a further preferred embodiment, the bird obstacles have a height in the range of 10 to 100 cm.

The longer the spikes are, the more effective they will hinder the birds. However, for cost effectiveness they should not be unnecessary long. The specified range takes both these aspects into consideration. Normally a height in the range of 20 to 70 cm, such as 30 to 70 cm will be appropriate.

According to a further preferred embodiment, the obstacles are mounted sufficiently close to each other to prevent the possibility for a bird to roost on said surface.

Sparsely mounted obstacles may reduce the attraction for birds to roost on the surface, but perhaps not fully prevent them. With the narrow mounting according to this embodiment, the object of the invention is more completely met. How close to each other the spikes are to be mounted is partly dependent on how long they are. The longer the spikes are, the sparser they can be mounted and still be preventive.

According to a further preferred embodiment, the distance between two neighbouring obstacles is in the range of 1 to 50 cm, such as 1 to 30 cm.

The distance must be sufficiently small in order to limit the space that can be used by the bird. On the other hand it is of interest not to mount an excess number of obstacles. The specified range represents an adequate balance in this respect. Optimally the distance is within 2 to 20 cm, such as 2 to 10 cm.

According to the second aspect of the invention, the problem is solved in that a wind turbine tower is provided with at least one cooling panel according to the present invention, in particular to any of the preferred embodiments thereof.

The advantages of a tower provided with such cooling panel assemblies, in particular to any of the preferred embodiments thereof are similar to those of the invented cooling panel assembly described above.

According to a further preferred embodiment, the tower is provided with at least three such cooling panel assemblies which are distributed equidistantly around the tower.

With such an arrangement of cooling panel assemblies it is assured to have a good cooling efficiency, since at least one of them will be exposed to the maximum wind.

In an embodiment of the present invention, the cooling panel assembly is dimensionally adapted to extend a section of the tower circumferential of less than half of the tower circumferential; in preferred embodiments, it extends a section of less than 60° of the tower circumferential.

Directions and angles specified in the present application relates to the cooling panel assembly in the position when mounted on the tower.

The above described preferred embodiments of the invention are set out in the dependent claims. It is to be understood that further preferred embodiments may be constituted by any possible combination of features of the described preferred embodiments and by any possible combination of features in these with features described in the description of examples below.

DESCRIPTION OF EXAMPLES

Figure 1:
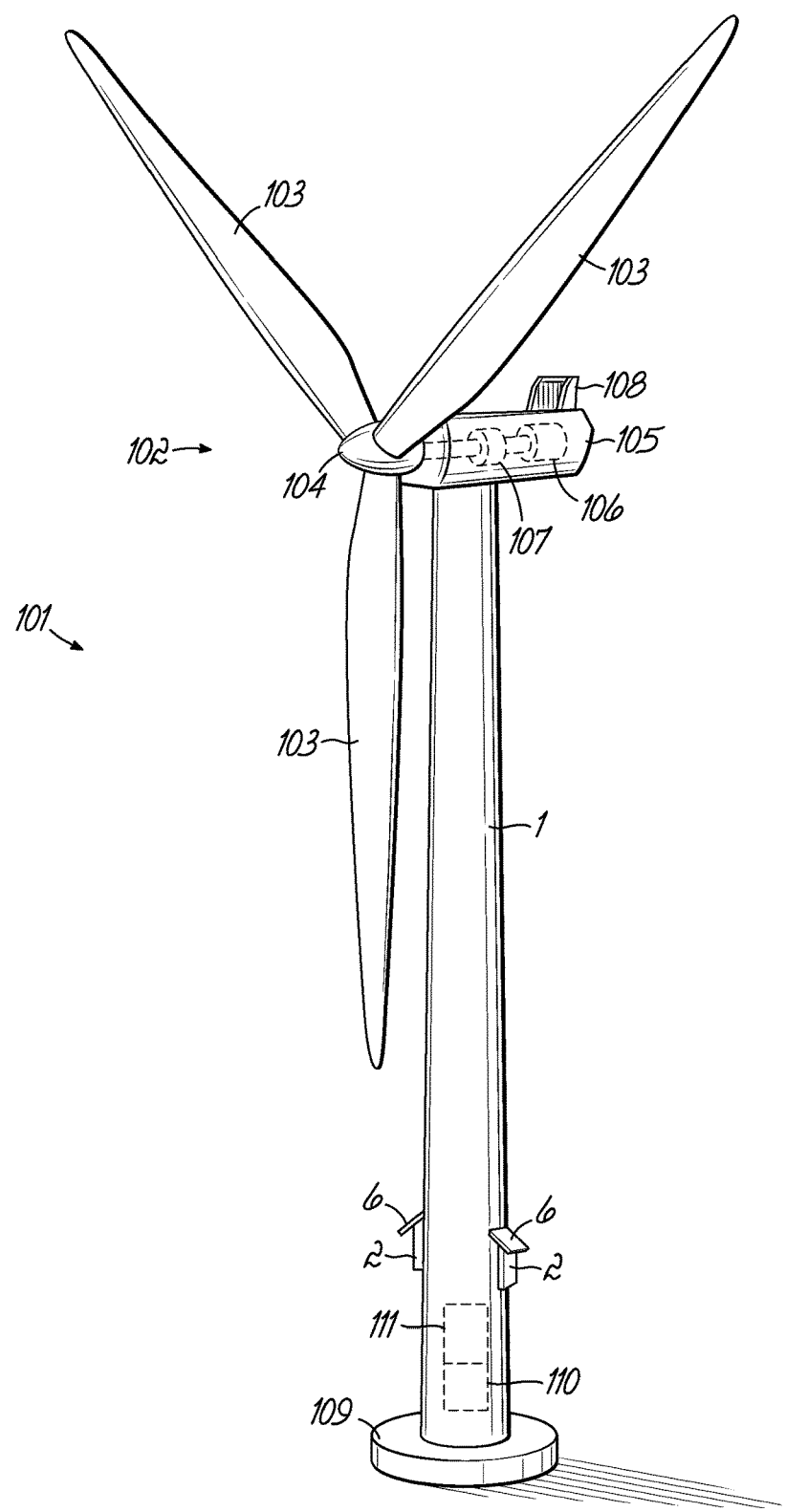
FIG. 1 is a perspective view of a wind turbine tower according to the present invention.

FIG. 1 shows a wind turbine 101 with a rotor 102 presenting a number of blades 103 and a hub 104 to which the blades are mounted. The wind turbine comprises a nacelle 105 provided at the top of a tower 1. The tower is supported by a foundation 109 arranged in the ground or on a sea platform. The nacelle 105 houses a generator 106 to which the rotor is connected via a gearbox 107. The gearbox 107 and the generator 106 heat during operation, and for this a cooling system including a heat exchanger 108 on the nacelle exterior is provided.

Inside the tower 1, close to the bottom of it, two heat generating components 110, 111 are provided in the form of an electric converter 111 and a transformer 110. A cooling circuit is provided for removing heat from the converter 111 and the transformer 110. The cooling circuit comprises a number of heat exchangers mounted to the tower. Each heat exchanger is constituted by a cooling panel assembly 2 and includes one or more cooling panels and a deflector panel means 6.

Figure 2:
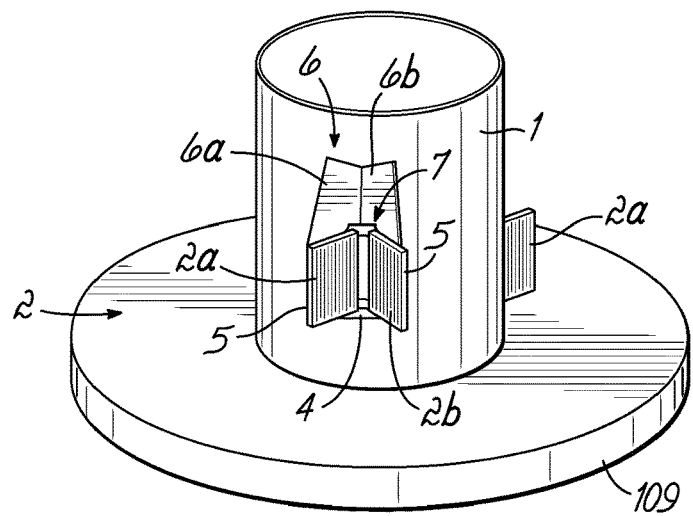
FIG. 2 is a perspective view of a bottom portion of a wind turbine tower and illustrates a cooling panel assembly according to a first example of the present invention.

FIG. 2 illustrates an example of a cooling panel assembly 2 according to the present invention. The cooling panel assembly 2 includes two separate cooling panels 2a, 2b. Each cooling panel is formed by a rectangular frame 5 with both sides of the rectangle being considerably larger than the thickness of the panel, i.e. the dimension perpendicular to the rectangle. Of course the shape may be other than rectangular. Within the frame 5 there is a packet of pipes for the heat exchanger circuit.

Each cooling panel 2a, 2b is vertically directed in the sense that its frame is parallel to a vertical plane. The two cooling panels 2a, 2b are positioned in a V-shape relative to each other, where they meet each other at a mounting structure 7 by which they are mounted to the tower 1. The angle between the cooling panels 2a, 2b is in the figure about 90°, but may be much larger or smaller than that. A bracket 4 supports the outer parts of the cooling panels 2a, 2b.

Figure 3:
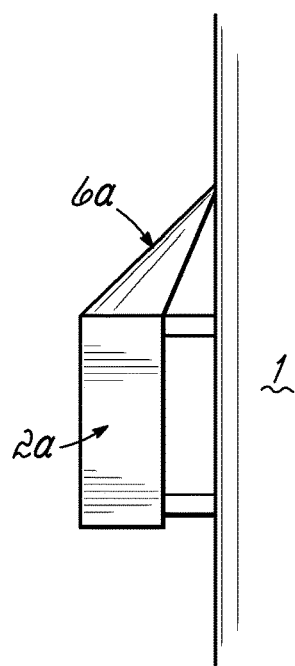
FIG. 3 is a schematic side view of a cooling panel assembly according to FIG. 2.
Figure 4:
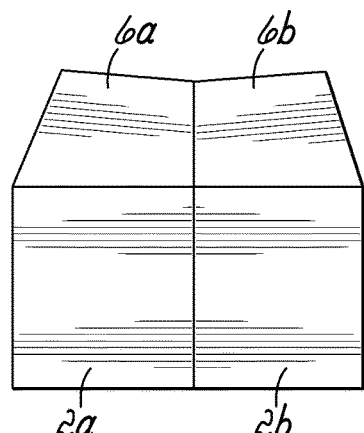
FIG. 4 is a schematic view from the left of the cooling panel assembly of FIG. 3.
Figure 5:
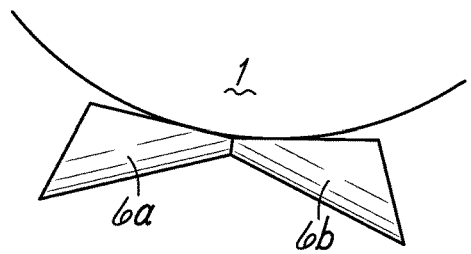
FIG. 5 is a schematic view from above of the cooling panel assembly of FIG. 3

Attached to the upper end of the cooling panels 2a, 2b is a deflector panel means 6, consisting of two deflector panels 6a, 6b connected to a respective one of the cooling panels 2a, 2b. The deflector panels 6a, 6b extend obliquely from the respective cooling panel 2a, 2b upwardly towards the tower 1, to which they are attached In FIG. 3 the cooling panel assembly 2 is shown from a side view tangential to the tower. In FIG. 4 the assembly is shown in a side view from the outside in the radial direction of the tower. The edges of the deflection panels 6a, 6b that face each other are shaped and located so that they meet each other in order to avoid any clearance between them. In FIG. 5 the deflection panels 6a, 6b of the cooling panel assembly 2 are seen from above.

Figure 6:
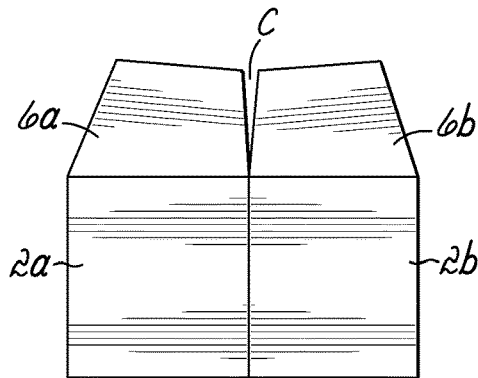
FIGS. 6 and 7 are views corresponding to those of FIGS. 4 and 5 but showing a second example of the invented cooling panel assembly.
Figure 7:
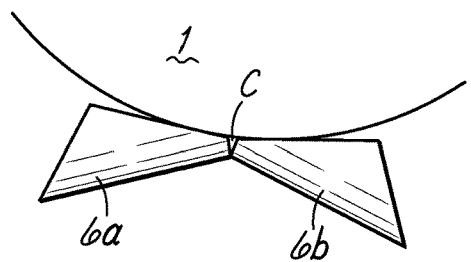

A slightly modified example is illustrated in FIGS. 6 and 7, which are views corresponding to those of FIGS. 4 and 5. In this example there is a small clearance C between the deflector panels 6a, 6b.

The deflector panels 6a, 6b are made of thin metal plates. Each panel may be constituted by a single plate or by a plurality of plates attached together. Each deflector panel 6a, 6b may be planar or curved. The angle between a deflector panel and the horizontal is preferably in the range of 15° and 45°, i.e. somewhat smaller than in the example illustrated in FIG. 3. In case of a non-planar plate the angle is calculated related to a straight line from the upper end to the lower end of the deflector panel.

Figure 8:
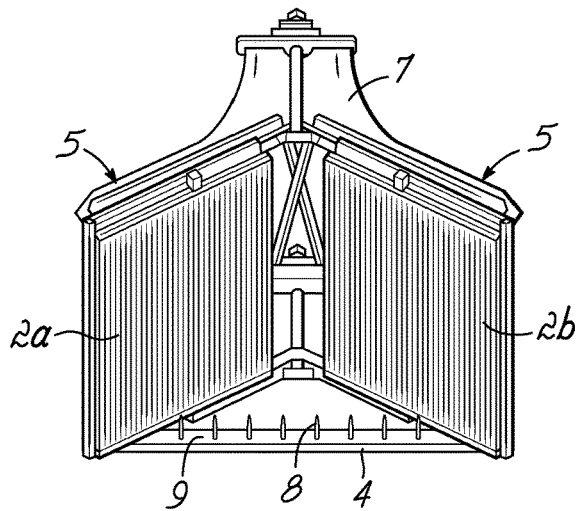
FIG. 8 is a perspective view of parts of a cooling panel assembly according to a further example of the invention.

FIG. 8 illustrates a further example of the invention. In this figure the deflector panels are left out for the sake of better visibility. On the upper surface 9 of the bracket 4 between the two cooling panels 2a, 2b there is mounted a number of spikes 8 to prevent seabirds from roosting thereon. The spikes are about 10 cm high and the distance between them is about 25 cm. Similar spikes may be mounted on every surface of the cooling panels 2a, 2b and the mounting structure 7 that is facing upwards.

Figure 9:
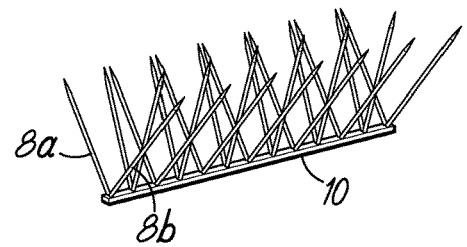
FIG. 9 is a perspective view of a detail according to a still further example of the invention.

FIG. 9 illustrates an alternative example for the arrangement of spikes. The spikes 8a, 8b are mounted pairwise in a V-shaped relation. They are attached along a strip 10, which is to be bolted to the surface in question. In the illustrated example every second pair of spikes have a smaller angle in the V-shape than the other pairs.

The invention claimed is:

1. A wind turbine tower, comprising:
at least one cooling panel assembly mounted on the tower and extending along a section of the tower circumference, the cooling panel assembly further comprising:
a pair of substantially vertical cooling panels deviating from each other outwardly from the tower such that a V-shape is established; and
a deflector means including two deflector panels mounted at the top of a respective one of the cooling panels such that the deflector panels shield the cooling panels from above, wherein the deflector panels have at least substantially the same circumferential extension as the cooling panels.

2. The wind turbine tower according to claim 1, wherein the deflector panels are sloped out from the tower in the downward direction.

3. The wind turbine tower according to claim 2, wherein the slope of the deflector panels is in the range of 15° to 45° with respect to the horizontal.

4. The wind turbine tower according to claim 3, wherein the slope of the deflector panels is in the range of 25° to 35°.

5. The wind turbine tower according to claim 1, wherein the two deflector panels meet each other without any clearance between them.

6. The wind turbine tower according to claim 1, wherein the deflector panels are made of a plate material.

7. The wind turbine tower according to claim 6, wherein the deflector panels are made of one or more metal plates.

8. The wind turbine tower according to claim 1, wherein surfaces of the cooling panel assembly which are located below the deflector means and are substantially horizontal and face upwards are provided with bird obstacles.

9. The wind turbine tower according to claim 8, wherein at least some of the bird obstacles are spikes.

10. The wind turbine tower according to claim 8, wherein the bird obstacles have a height in the range of 10 to 100 cm.

11. The wind turbine tower according to claim 10, wherein the bird obstacles have a height in the range of 20 to 70 cm.

12. The wind turbine tower to claim 8, wherein the obstacles are mounted sufficiently close to each other to prevent the possibility for a seabird to roost on said surface.

13. The wind turbine tower according to claim 12, wherein the distance between two neighbouring obstacles is in the range of 1 to 50 cm.

14. The wind turbine tower according to claim 13, wherein the distance between two neighbouring obstacles is in the range of 2 to 20 cm.

15. The wind turbine tower according to claim 1, wherein the tower is provided with three cooling panel assemblies which are distributed equidistant around the tower.

\* \* \* \* \*